(12) United States Patent
Anderson et al.

(10) Patent No.: US 12,233,770 B2
(45) Date of Patent: Feb. 25, 2025

(54) WHEEL CHOCK DEVICE AND METHOD OF FORMING

(71) Applicant: Transportation IP Holdings, LLC, Norwalk, CT (US)

(72) Inventors: John D. Anderson, Oswego, IL (US); Walter J. Peach, Montgomery, IL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 862 days.

(21) Appl. No.: 17/340,452

(22) Filed: Jun. 7, 2021

(65) Prior Publication Data
US 2022/0388440 A1 Dec. 8, 2022

(51) Int. Cl.
*B60P 3/077* (2006.01)

(52) U.S. Cl.
CPC .................................. *B60P 3/077* (2013.01)

(58) Field of Classification Search
CPC ..................................................... B60P 3/077
USPC ......................................................... 410/30
See application file for complete search history.

(56) References Cited

U.S. PATENT DOCUMENTS

| | | | |
|---|---|---|---|
| 7,513,725 B1 | 4/2009 | Bullock | |
| 7,824,138 B2 | 11/2010 | Bullock | |
| 8,047,751 B2 * | 11/2011 | Powers | B60T 3/00 |
| | | | 410/23 |
| 8,961,083 B2 | 2/2015 | Cencer | |
| 9,321,389 B2 | 4/2016 | Anderson et al. | |
| 11,007,920 B2 * | 5/2021 | Vande Sande | B60P 3/075 |
| 2015/0210200 A1 | 7/2015 | Vande Sande et al. | |
| 2017/0106779 A1 | 4/2017 | Morin | |

OTHER PUBLICATIONS

First Examination Repoer received for related Indian Patent Application No. 202114052887 mailed Dec. 22, 2022 (7 pages).

* cited by examiner

*Primary Examiner* — Hilary L Gutman
(74) *Attorney, Agent, or Firm* — K&L Gates LLP (57) ABSTRACT

A vehicle chock device includes a first body portion and a stepped-box body integrally formed with the first body portion. The stepped-box body has a lower portion and an upper portion. The stepped-box body transitions from a first generally planar, generally horizontal surface on the lower portion to an intermediate sloped surface to a generally planar, generally vertical surface on the upper portion. The lower portion has a second generally planar, generally horizontal surface configured to engage a supporting surface of a carrier vehicle on which an automobile is disposed. An opposite side of the upper portion that is opposite the generally planar, generally vertical surface defines a tire-contacting surface that is positioned to engage a vehicle tire of the automobile while the second generally planar, generally horizontal surface engages the supporting surface of the carrier vehicle.

17 Claims, 9 Drawing Sheets

WHEEL CHOCK DEVICE AND METHOD OF FORMING

BACKGROUND

Technical Field

The subject matter described relates to wheel chock devices and assemblies which secure an automobile to a carrier or transporter vehicle on which the automobile is transported.

Discussion of Art

Wheel chock assemblies include wheel chock devices (or chocks) that are wedged underneath a tire of a wheel of a road vehicle to restrain movement of the road vehicle. The assembly may include two wheel chock devices that engage the same tire and connect to each other via a harness that wraps around a portion of the tire circumference. The road vehicle can be an automobile. The wheel chock devices secure to a deck of a carrier vehicle that transports the automobile.

One technical problem with existing wheel chock devices is that mechanical stresses may concentrate in specific areas of the chock devices. For example, as the chock device is compressed between the tire of the automobile and the deck of the carrier vehicle, some portions of the chock may experience relatively high mechanical stresses that could eventually cause those areas to deform and/or crack. Damage to the chock device under a load destroys the structural integrity, and the utility, of the chock device.

BRIEF DESCRIPTION

In one or more embodiments, a vehicle chock device is provided that includes a first body portion (e.g., a rectangular box-shaped body) and a stepped-box body integrally formed with the first body portion. The stepped-box body has a lower portion and an upper portion. The stepped-box body transitions from a first generally planar, generally horizontal surface on the lower portion to an intermediate sloped surface to a generally planar, generally vertical surface on the upper portion. The lower portion has a second generally planar, generally horizontal surface configured to engage a supporting surface of a carrier vehicle on which an automobile is disposed. An opposite side of the upper portion that is opposite the generally planar, generally vertical surface defines a tire-contacting surface that is positioned to engage a vehicle tire of the automobile while the second generally planar, generally horizontal surface engages the supporting surface of the carrier vehicle.

In one or more embodiments, a wheel chock device is provided that includes a stepped-box body. The stepped-box body has a coupling surface, a tire-contacting surface, and a body surface. The coupling surface positioned to face a supporting surface of a carrier vehicle on which an automobile is disposed. The tire-contacting surface is positioned to engage a tire of the automobile, and the body surface extends between the coupling surface and the tire-contacting surface along a perimeter of the stepped-box body. The body surface is positioned to face a body of the automobile. The body surface includes a horizontally oriented segment that is parallel to the coupling surface, a generally vertically oriented segment that is generally perpendicular to the horizontally oriented segment, and an intermediate sloped segment extending from the horizontally oriented segment to the vertically oriented segment.

In one or more embodiments, a method is disclosed for providing a wheel chock device. The method includes forming a wheel chock device for an automobile to have a stepped-box body with a coupling surface, a tire-contacting surface, and a body surface. The coupling surface is formed to face a supporting surface of a carrier vehicle on which the automobile is disposed. The tire-contacting surface is formed to engage a tire of the automobile. The body surface is formed to extend between the coupling surface and the tire-contacting surface along a perimeter of the stepped-box body, and to face a body of the automobile. The body surface is formed to include a horizontally oriented segment that is parallel to the coupling surface, a substantially vertically oriented segment that is perpendicular to the horizontally oriented segment, and an intermediate sloped segment extending from the horizontally oriented segment to the substantially vertically oriented segment.

In one or more embodiments, a coupling mechanism is provided that includes a clip and a rod. The clip includes a base section, a tab, and a neck. The neck connects the base section to the tab. The base section is configured to attach to a strap. The rod extends along a rod axis and is held by a wheel chock device. The rod defines an opening along an outer surface thereof. The opening includes a central cavity, a first pocket, and a second pocket. The first pocket and the second pocket extend in opposite directions from the central cavity. A length of the central cavity along the rod axis is longer than a length of the tab, and respective lengths of the first and second pockets along the rod axis are shorter than the length of the tab.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to wheel chock devices structurally designed for enhanced distribution and dissipation of mechanical stresses through the chock devices relative to conventional wheel chocks. For example, the wheel chock devices described herein may be capable of withstanding greater mechanical stresses and/or similar mechanical stresses for longer durations without compromising the integrity of (e.g., damaging) the chock device, relative to the conventional wheel chocks. The enhanced stress performance may be achieved, at least in part, through design modifications in the structural body of the wheel chock device, without increasing the size, weight, or manufacturing cost of the wheel chock devices relative to the conventional chocks. The wheel chock devices described herein may conform to all applicable regulatory requirements. For example, the wheel chock devices may accommodate narrow clearances between the tires and body panels (e.g., fenders) of modern, low profile automobiles without risk of bumping into and potentially damaging the body panels.

Figure 1:
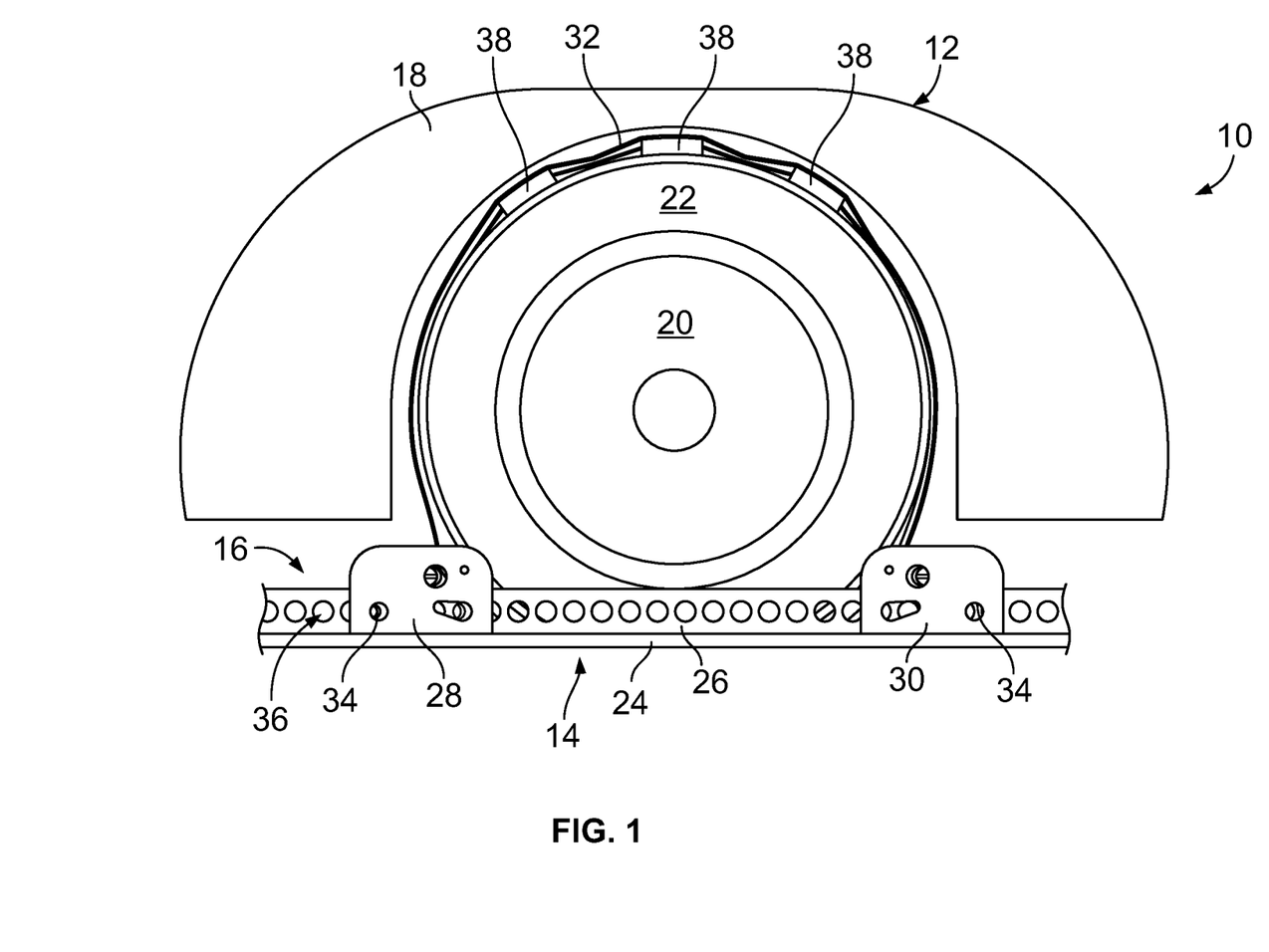
FIG. 1 illustrates a vehicle system in accordance with an embodiment.

FIG. 1 illustrates a vehicle system 10 in accordance with an embodiment. The vehicle system shows a portion of an automobile 12 secured to a carrier vehicle 14 via a wheel chock assembly 16. The illustrated portion of the automobile includes a fender 18, a wheel 20, and a tire 22 on the wheel. The wheel and tire are located in a wheel well defined by the fender. The automobile may be any self-powered road-traveling vehicle that has multiple wheels with tires that contact the road surface, such as but not limited to cars, vans, and trucks. The carrier vehicle has a deck 24 on which the vehicle is supported. The deck is coupled to a chock rail 26 that extends a length along the deck. The carrier vehicle may be a rail vehicle, an aircraft, a ship (e.g., marine vessel), a large trailer pulled by a tractor truck, or the like. In a non-limiting example, the carrier vehicle is an auto-rack rail vehicle.

The wheel chock assembly includes a first wheel chock device 28, a second wheel chock device 30, and a harness 32. The first and second wheel chock devices are disposed on the deck and engage different portions of the tire on either side of a deck-contacting segment of the tire. The first and second chock devices are each releasably secured to the chock rail via a respective locking mechanism 34 on each chock device. The locking mechanism includes locking pins 114 (shown in FIG. 3) that extend through corresponding apertures 36 in the chock rail.

The harness is or includes a strap that extends from the first wheel chock device around at least a portion of the circumference of the tire, in contact with the tread of the tire, to the second wheel chock device. The harness is secured to both wheel chock devices via rods or tubes within the wheel chock devices. The harness may include several blocks or cleats 38 spaced apart along the length of the harness. The cleats engage the tire tread at several points along the upper circumference of the tire to keep the harness strap from falling off along a side of the tire.

Optionally, one of the chock devices is an active chock and the other is an anchor chock. The installation process for an operator may involve deploying the harness over the tire and locking both the active chock and the anchor chock to the carrier vehicle via the respective locking mechanisms. The operator may connect a first end of the harness to the anchor chock, such as to a rod of the anchor chock. The opposite, second end of the harness is connected to a rod (e.g., a torque tube) of the active chock. With the harness connected to both chocks, the operator can tighten the harness around the tire by ratcheting the rod of the active chock until a desired amount of tension or downward force is exerted on the tire. In an alternative embodiment, both the first and second chock devices are active chocks, so both can be ratcheted to tighten the harness around the tire.

Figure 2:
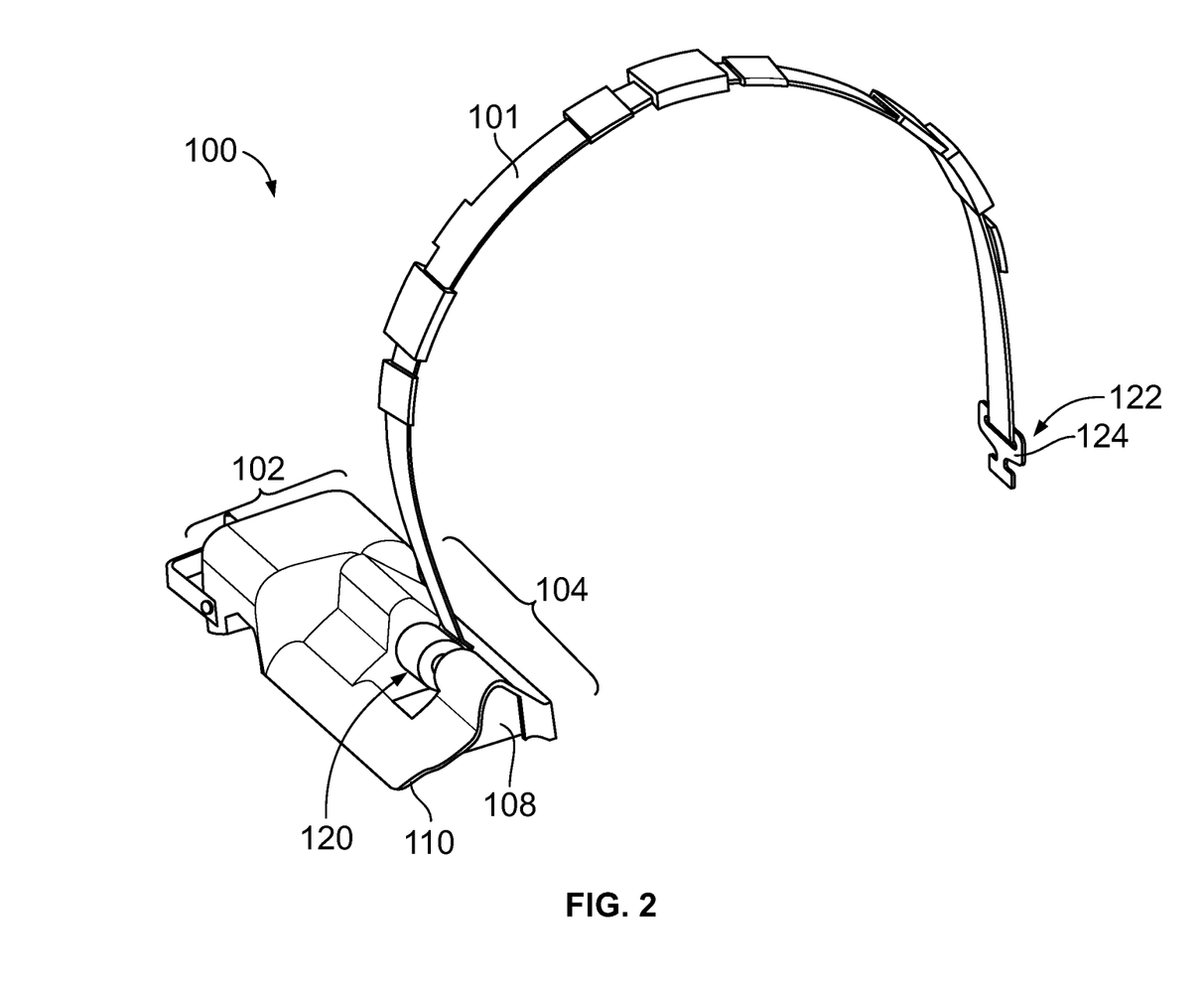
FIG. 2 is a perspective top-down view of a wheel chock device and a harness connected to the wheel chock device according to an embodiment.
Figure 3:
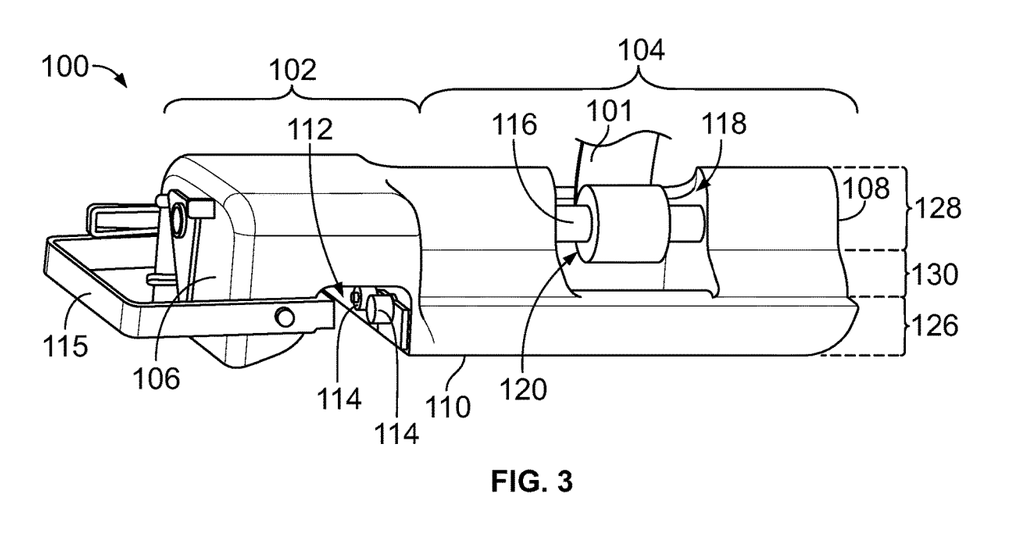
FIG. 3 is a perspective side view of the wheel chock device of FIG. 2.
Figure 4:
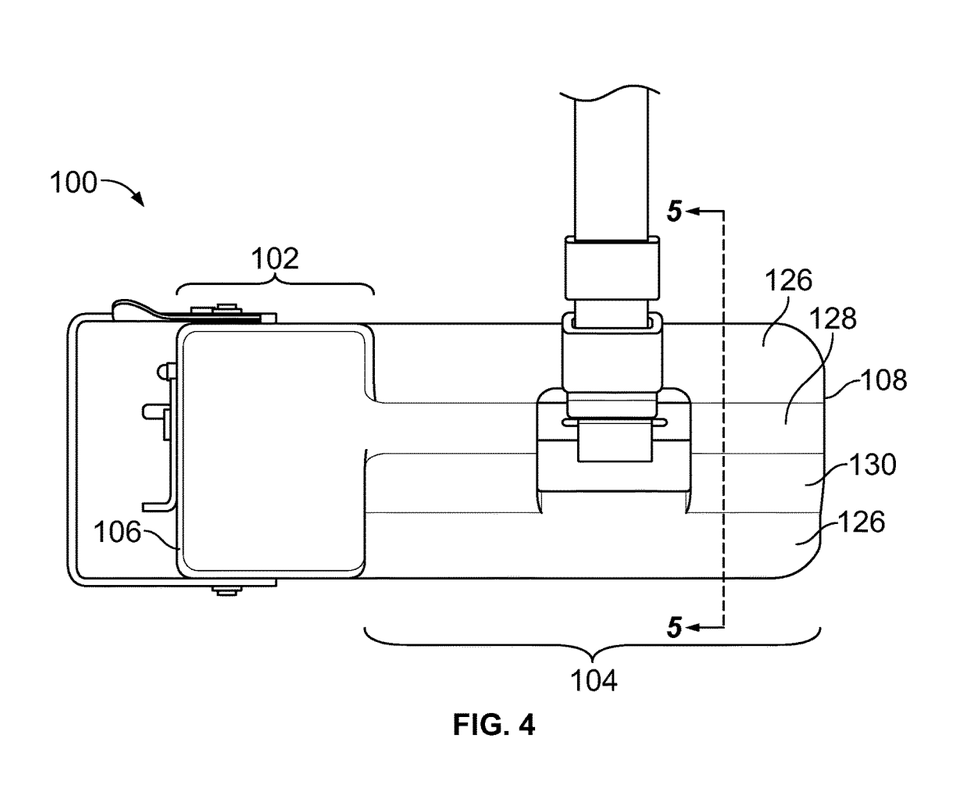
FIG. 4 is a top-down plan view of the wheel chock device of FIGS. 2 and 3.

FIG. 2 is a perspective top-down view of a wheel chock device 100 and a harness 101 connected to the wheel chock device. The wheel chock device in FIG. 2 may represent the first wheel chock device or the second wheel chock device shown in FIG. 1, and the harness in FIG. 2 may be the harness in FIG. 1. FIG. 3 is a perspective side view of the wheel chock device of FIG. 2. FIG. 4 is a top-down plan view of the wheel chock device of FIGS. 2 and 3.

Referring to FIGS. 2 through 4, the wheel chock device includes a first body portion 102 and a stepped-box body 104. In an embodiment, the stepped-box body is integrally formed with the first body portion. For example, the two bodies may be seamlessly connected to each other to define a unitary, one-piece (e.g., monolithic) structure. The two bodies may be formed together in a common molding process, or one of the bodies may be formed in-situ on the surface of the other body that is pre-formed. In an embodiment, the first body portion and the stepped-box body are non-metallic. For example, the bodies may be composed of one or more plastics and molded to form the shape of the illustrated final product. In an embodiment, the first body portion may be a rectangular box-shaped body. In other embodiments, the first body portion may have a rounded, ovoid, or spherical shape, alone or in combination with one or more box-shaped portions.

The first body portion and the stepped-box body may be laterally disposed side-by-side to each other. The first body portion includes a first end wall 106, and the stepped-box body includes a second end wall 108. The wheel chock device is elongated from the first end wall to the second end wall. The wheel chock device includes a coupling surface 110 that is positioned to face a supporting surface of a carrier vehicle. In the embodiment shown in FIG. 1, the supporting surface of the carrier vehicle is the deck 24. The coupling surface is generally planar. When the wheel chock device is installed on the carrier vehicle as shown in FIG. 1, the coupling surface is generally horizontal and may define a bottom side of the wheel chock device.

With specific reference to FIG. 3, the first body portion is designed to couple with a chock rail on a carrier vehicle, such as the chock rail 26 shown in FIG. 1. The first body portion defines a channel 112 through the coupling surface. The channel is sized and shaped to accommodate the chock rail of the carrier vehicle. For example, the channel may have a rectangular prism shape. The wheel chock device may include multiple locking pins 114 that protrude into the channel at spaced apart locations. The locking pins are actuated to enter corresponding apertures in the chock rail. For example, the locking pins may be actuated by manually pivoting a locking handle 115 secured to the first body portion. The locking handle is operatively connected to the locking pins via a mechanical linkage such that the rotation of the locking handle in one direction forces the locking pins to move towards and into corresponding apertures in the chock rail. When the locking pins extend through the apertures in the chock rail, the wheel chock device is secured to the carrier vehicle. Rotating the locking handle in the opposite direction backs the locking pins out of the apertures to release the wheel chock device from the chock rail. Other locking mechanisms may be utilized in other embodiments, such as providing helical threads on the locking pins to enable actuating the locking pins by rotating each locking pin.

The wheel chock device in the illustrated embodiment is an active chock that includes a rod (e.g., torque tube) 116 extending through the length of the wheel chock device. The rod may extend fully from the first end wall to the second end wall. The stepped-box body defines a cavity or window 118 at an intermediate portion along the length of the stepped-box body, spaced apart from the each of the second end wall and an interface between the stepped-box body and the first body portion. The rod extends through the cavity. The portion of the rod that aligns with the cavity is an exposed segment of the rod that is not covered by or within the stepped-box body. The harness is secured to the rod within the cavity of the stepped-box body. The rod rotates in a first direction to tighten the harness and rotates in an opposite direction to loosen the harness.

As shown in FIG. 2, the harness has a proximal end 120 that is secured to the rod of the wheel chock device. A distal end 122 of the harness, opposite the proximal end, has a clip 124 for releasably coupling to a rod of an anchor chock. Although the wheel chock device shown in FIGS. 2 through 4 is an active chock, the anchor chock may have the same structural features as the active chock. For example, the anchor chock may have the same first body portion (e.g., rectangular box-shaped body) and stepped-box body as the illustrated active chock. The description herein of the first body portion and the stepped-box body may refer to both an active chock and an anchor chock.

Referring to FIGS. 3 and 4, the stepped-box body has a lower portion 126 and an upper portion 128. The lower portion is a relatively wide base. The lower portion defines the coupling surface. The upper portion is a hump that is narrower than the lower portion. The upper portion defines an upper end of the stepped-box body, opposite the coupling surface. The stepped-box body transitions from the lower portion to the upper portion. In an embodiment, the stepped-box body includes a middle portion 130 between the lower portion and the upper portion. The middle portion provides a gradual transition between the wide lower portion and the narrow upper portion. The middle portion may increase the structural integrity of the wheel chock device by providing enhanced mechanical support of the upper portion which engages the tire of the automobile. The middle portion may reduce stresses experienced by the upper and lower portions of the stepped-box body, relative to wheel chock devices that do not include the middle portion.

Figure 5:
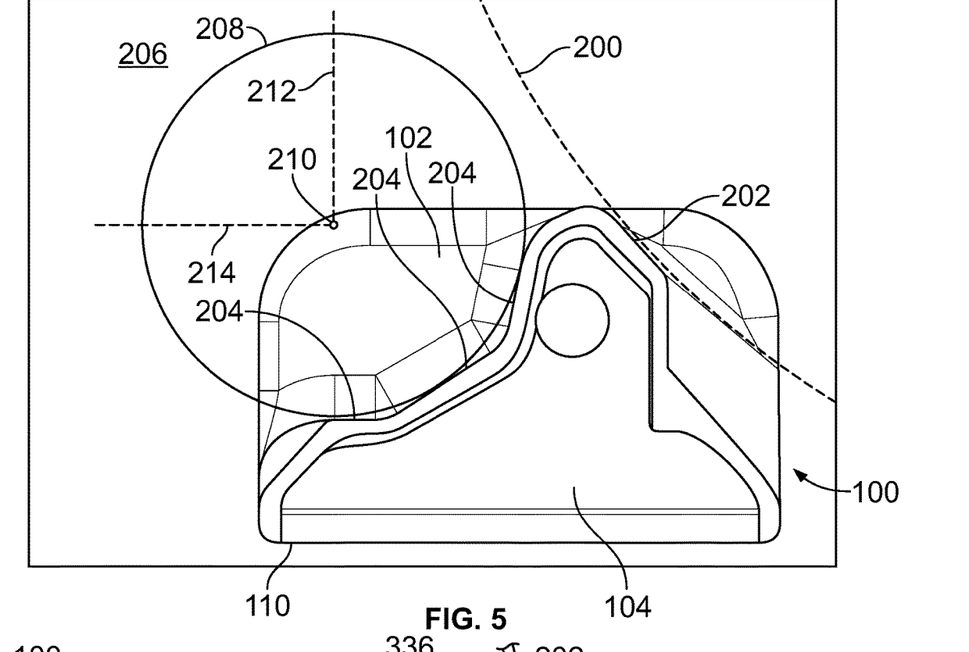
FIG. 5 illustrates a cross-section of the wheel chock device shown in FIGS. 2 through 4.

FIG. 5 illustrates a cross-section of the wheel chock device 100 shown in FIGS. 2 through 4. The wheel chock device in FIG. 5 is shown without hardware, such as the rod, and without the harness. The cross-section is taken along line 5-5 in FIG. 4, which intersects the stepped-box body. The illustrated embodiment shows the wheel chock device in physical contact with a tire 200 of an automobile. The tire 200 may be the tire 22 shown in FIG. 1. The tire is shown in phantom. The chock device placement can vary relative to the tire, controlled/limited by the engagement between the locking pins within the channel of the first body portion and the aperture spacing within the chock rail. The stepped-box body may be generally hollow to conserve material. The upper portion of the stepped-box body defines a tire-contacting surface 202. The tire-contacting surface is positioned and contoured to engage (e.g., abut in physical contact with) the tread of the tire while the coupling surface engages the supporting surface of the carrier vehicle. The engagement between the tire-contacting surface and the tire provides a hard stop that prohibits the wheel attached to the tire from rolling any farther in the direction of the wheel chock device.

The stepped-box body includes a body surface 204 that extends between the coupling surface and the tire-contacting surface along a perimeter of the stepped-box body. The body surface is located along a side of the upper portion, the middle portion, and the lower portion generally opposite the tire-contacting surface of the upper portion. The body surface is positioned to face a body 206 of the automobile. The body 206 is shown in phantom in FIG. 5. The body may include or represent a body panel, such as the fender 18 shown in FIG. 1. The body surface has a non-uniform, irregular contour along the length of the body surface, including generally planar surfaces and curved surfaces. The body surface may generally provide a concave shape to increase a clearance distance between the body of the automobile and the stepped-body body. Providing adequate clearance between the stepped-box body and the automobile body ensures that the wheel chock device does not contact and damage the automobile body. For example, the automobile may move relative to the wheel chock device as the carrier vehicle travels along a route due to vibration, acceleration/deceleration, and the like. The contour of the body surface is designed, in part, to provide sufficient clearance from the automobile bodies of standard automobiles to reduce the risk of impacts between the stepped-box body and the automobile body.

FIG. 5 shows an R-value clearance range 208 between the stepped-box body and the body of the automobile. The R-value clearance range represents a minimum clearance (e.g., distance) between the body surface of the stepped-box body and the closest part of the automobile body. In the illustrated embodiment, the closest part of the automobile body is a corner 210 of the body at the intersection between a generally vertical segment 212 and a generally horizontal segment 214. The R-value clearance range is a circle centered at the corner of the body. The circle of the R-value clearance range is sized to only just intersect the body surface of the stepped-box body, or may be sized such that the circle just barely does not intersect the body surface of the stepped-box body.

In one or more embodiments, the R-value clearance range of the wheel chock device is at least 2.51 inches (6.375 cm). For example, when the tire-contacting surface of the upper portion is spaced apart from the tire of an automobile by a predetermined gap of 0.688 inches and the wheel chock device is installed on the carrier vehicle, the closest part of the stepped-box body is at least 2.51 inches from the closest part of the automobile body. As shown in FIG. 1, the closest part of the automobile body may be a body panel, such as a fender. In a non-limiting example, the R-value clearance range of the wheel chock device is at least 2.586 inches (6.5684 cm). The R-value clearance range of the wheel chock device is greater than some conventional chock devices.

The wheel chock device may meet all applicable regulations. For example, the R-value clearance range is a distance between the wheel chock device and the closest part of an automobile according to reference vehicle dimensions. The reference vehicle dimensions may be based on a survey of standard model automobiles. For example, the survey may collect designated measurements for each of the standard model automobiles, and then may use the collected measurements to generate the reference vehicle dimensions on which the R-value clearance range is based. For example, the smallest, most conservative value for each of the designated measurements may be used to generate the reference vehicle dimensions.

The R-value clearance range provided by the wheel chock device disclosed herein may be sufficiently large to satisfy inclusion of the wheel chock device in one or more recommended regulatory categories for wheel chocks. One specification is chock replacement guidelines published by the Association of American Railroads (AAR). The R-value clearance range of at least 2.51 inches qualifies the chock device for inclusion in a specific regulatory category (e.g., Group C) of chocks approved by the AAR. The wheel chock device may provide a sufficiently large R-value clearance range for approved use with modern automobiles.

Figure 6:
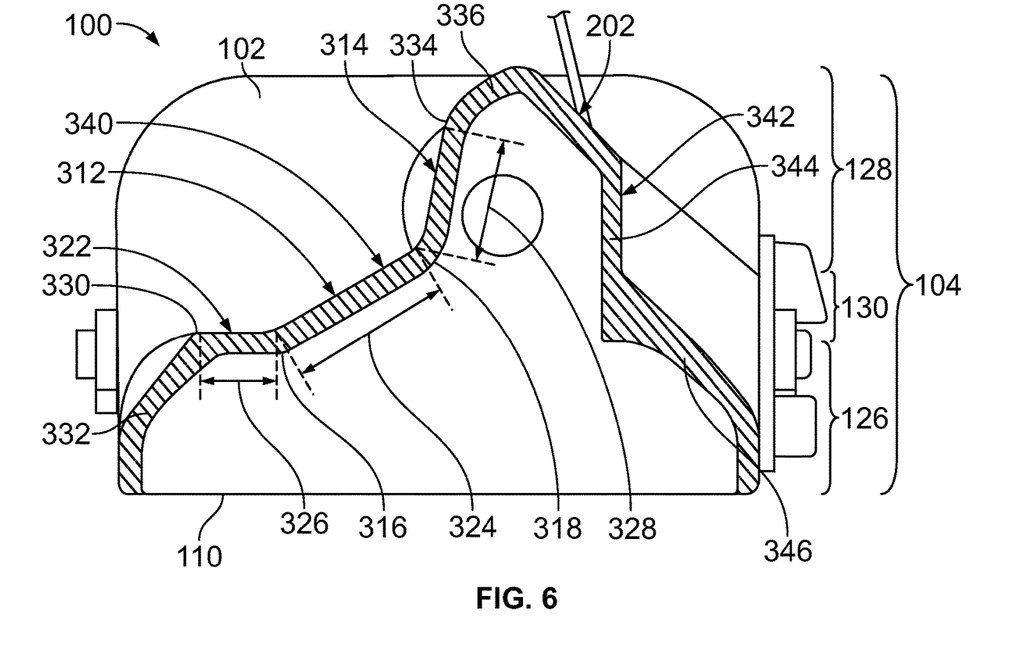
FIG. 6 is a cross-sectional view of the wheel chock device taken along the line 5-5 in FIG. 4.

FIG. 6 is a cross-sectional view of the wheel chock device taken along the line 5-5 in FIG. 4. The wheel chock device is assembled in FIG. 6 with hardware and harness attached, unlike in FIG. 5. The stepped-box body includes a first generally planar, generally horizontal surface 322 on the lower portion 126. The first generally planar, generally horizontal surface may be disposed along a plane that is parallel to a plane defined by the coupling surface of the lower portion. For example, the coupling surface may be referred to herein as a second generally planar, generally horizontal surface. The first generally planar, generally horizontal surface may face in an opposite direction relative to the coupling surface. The first generally planar, generally horizontal surface is a segment of the body surface 204, and is also referred to herein as a horizontally oriented segment of the body surface.

The horizontally oriented segment of the body surface transitions to an intermediate sloped segment 312 of the body surface. The intermediate sloped segment is disposed along the middle portion of the stepped-body body, between the lower portion and the upper portion. The intermediate sloped segment of the body surface is also referred to herein as an intermediate sloped surface. The intermediate sloped segment may be generally planar. For example, an entirety or at least a majority of the width of the intermediate sloped segment may be planar. In an alternative embodiment, the intermediate sloped segment a curvature along at least a majority of the width.

The intermediate sloped segment is angled relative to the horizontally oriented segment and intersects the horizontally oriented segment at a first vertex 316 or edge. The first vertex optionally may be curved to provide a smooth transition between the horizontally oriented segment and the intermediate sloped segment. Alternatively, the first vertex may be angular (e.g., not curved). The intermediate sloped surface may be angled between 15 degrees and 60 degrees relative to the horizontally oriented segment. In more specific examples, the intermediate sloped surface may be angled between 20 degrees and 40 degrees relative to the horizontally oriented segment, such as between 25 degrees and 35 degrees. In a non-limiting example, the intermediate sloped surface is angled about 30 degrees, such as between 29 degrees and 31 degrees relative to the horizontally oriented segment. Because the horizontally oriented segment may be parallel to the coupling surface, the intermediate sloped surface may also be angled between 15 degrees and 60 degrees, or the more specific ranges, relative to the coupling surface. The intermediate sloped segment is angled such that the intermediate sloped segment generally points towards the tire-contacting surface 202. For example, a tangent line extending from the body surface at the intermediate sloped segment may intersect the tire-contacting surface. The intermediate sloped segment may provide structural support and rigidity within the wheel chock device, and may reduce mechanical stresses concentrated in certain areas of the stepped-box body relative to wheel chocks that do not have the intermediate sloped segment.

The intermediate sloped segment of the body surface transitions to a vertically oriented segment 314 of the body surface. The vertically oriented segment is disposed along the upper portion of the stepped-body body. The vertically oriented segment may be generally planar. For example, the vertically oriented segment of the body surface is also referred to herein as a generally planar, generally vertical surface. The vertically oriented segment is disposed on an opposite side of the upper portion (e.g., the hump) than the tire-contacting surface. For example, a top of the hump is between the tire-contacting surface and the vertically oriented segment of the body surface. The vertically oriented segment may be oriented generally orthogonal to the horizontally oriented segment of the body surface and the coupling surface. The intermediate sloped segment intersects the vertically oriented segment at a second vertex 318 or edge. The second vertex optionally may be curved to provide a smooth transition between the intermediate sloped segment and the vertically oriented segment. Alternatively, the second vertex may be angular.

In a direction from the coupling surface towards the top of the upper portion, the body surface transitions from the horizontally oriented segment to the intermediate sloped segment, and from the intermediate sloped segment to the vertically oriented segment. Stated differently, the stepped-box body transitions from the first generally planar, generally horizontal surface on the lower portion to the intermediate sloped surface on the middle portion, and from the intermediate sloped surface to the generally planar, generally vertical surface on the upper portion. In the illustrated embodiment, the body surface includes three generally planar segments connected in series via curved vertices.

In an embodiment, a width 324 (e.g., a first width) of the intermediate sloped segment of the body surface is defined from the first vertex 316 to the second vertex 318. A width 326 (e.g., second width) of the horizontally oriented segment extends from the first vertex to an end 330 of the horizontally oriented segment opposite the first vertex. The end intersects a first transition region 332 that extends along the lower portion from the horizontally oriented segment to the coupling surface. A width 328 (e.g., a third width) of the vertically oriented segment extends from the second vertex to an end 334 of the vertically oriented segment opposite the second vertex. The end of the vertically oriented segment intersects a second transition region 336 along the upper portion that extends from the vertically oriented segment to the tire-contacting surface. In an embodiment, the (first) width of the intermediate sloped segment is greater than the (second) width of the horizontally oriented segment and the (third) width of the vertically oriented segment. The width of the vertically oriented segment may be greater than the width of the horizontally oriented segment. In an embodiment, a thickness of the walls of the stepped-box body that define the segments of the body surface is generally uniform. For example, the wall thickness at the intermediate sloped segment is approximately the same as the wall thickness of the vertically oriented segment and the wall thickness of the horizontally oriented segment.

The stepped-box body has the intermediate sloped segment of the body surface to reduce the amount of mechanical stress experienced by areas of the stepped-box body when in use to chock a wheel of an automobile, relative to a different wheel chock device that does not include the intermediate sloped segment. When the tire of the automobile exerts a force on the tire-contacting surface, that force is transferred through the stepped-box body. For example, the body surface experiences compressive forces from above via the tire on the tire-contacting surface, and from below the normal force of the supporting surface of the carrier vehicle exerted on the coupling surface, from below. The forces exerted on the stepped-box body from both above and below cause mechanical stresses along the perimeter of the stepped-box body, particularly along the body surface.

These stresses have been experimentally demonstrated via finite element analysis (FEA) stress tests. In the different wheel chock device that does not include the intermediate sloped segment of the body surface, a generally horizontal surface directly transitions to a generally vertical surface along a curved vertex. The stress tests indicated that significant stresses concentrate at the curved vertex and also at an area between the generally horizontal surface and a bottom surface of the different chock device. These high stress areas risk structural failure (e.g., collapse or deformation), which would prematurely end the operational life of wheel chock device. The wheel chock device according to the embodiments described herein performed significantly better with the stress tests than the different chock device. For example, the intermediate sloped segment received significantly less stress, while the tire-contacting surface engaged the tire, than the curved vertex of the different chock device. Without being bound by any particular theory, the gradual transition between the vertically oriented segment of the body surface and the horizontally oriented segment provided by the intermediate sloped segment is successful at spreading the mechanical stresses along the length of the body surface to reduce or eliminate high-stress areas, which improves structural integrity and rigidity, extending the operational life of the wheel chock device.

The body surface is disposed along a body-facing side 340 of the stepped-box body. The stepped-box body includes a tire-facing side 342 opposite the body-facing side. For example, the perimeter of the stepped-box body along the cross-section shown in FIG. 6 is defined by the coupling surface, the body-facing side, and the tire-facing side. The tire-facing side and the body-facing side extend in different directions from the top of the upper portion (e.g., hump). Both the tire-facing side and the body-facing side extend along the upper portion, the middle portion, and the lower portion. The surfaces of the body-facing side are described above. The tire-facing side includes the tire-contacting surface, a vertically oriented surface 344, and a sloped surface 346. The vertically oriented surface extends from the tire-facing side to the sloped surface. Both the tire-contacting surface and the vertically oriented surface are disposed along the upper portion. The sloped surface extends from the vertically oriented surface to the coupling surface. The sloped surface spans the middle portion and the lower portion of the stepped-box body. Optionally, the wall thickness of the stepped-box body may be approximately uniform along the different segments thereof. The wall thickness may be less than 0.5 inch, such as about 0.25 inch. In an alternative embodiment, the wall thickness of the sloped segment may be greater than the wall thickness of the vertically oriented surface and the wall thickness of the tire-contacting surface.

Figure 7:
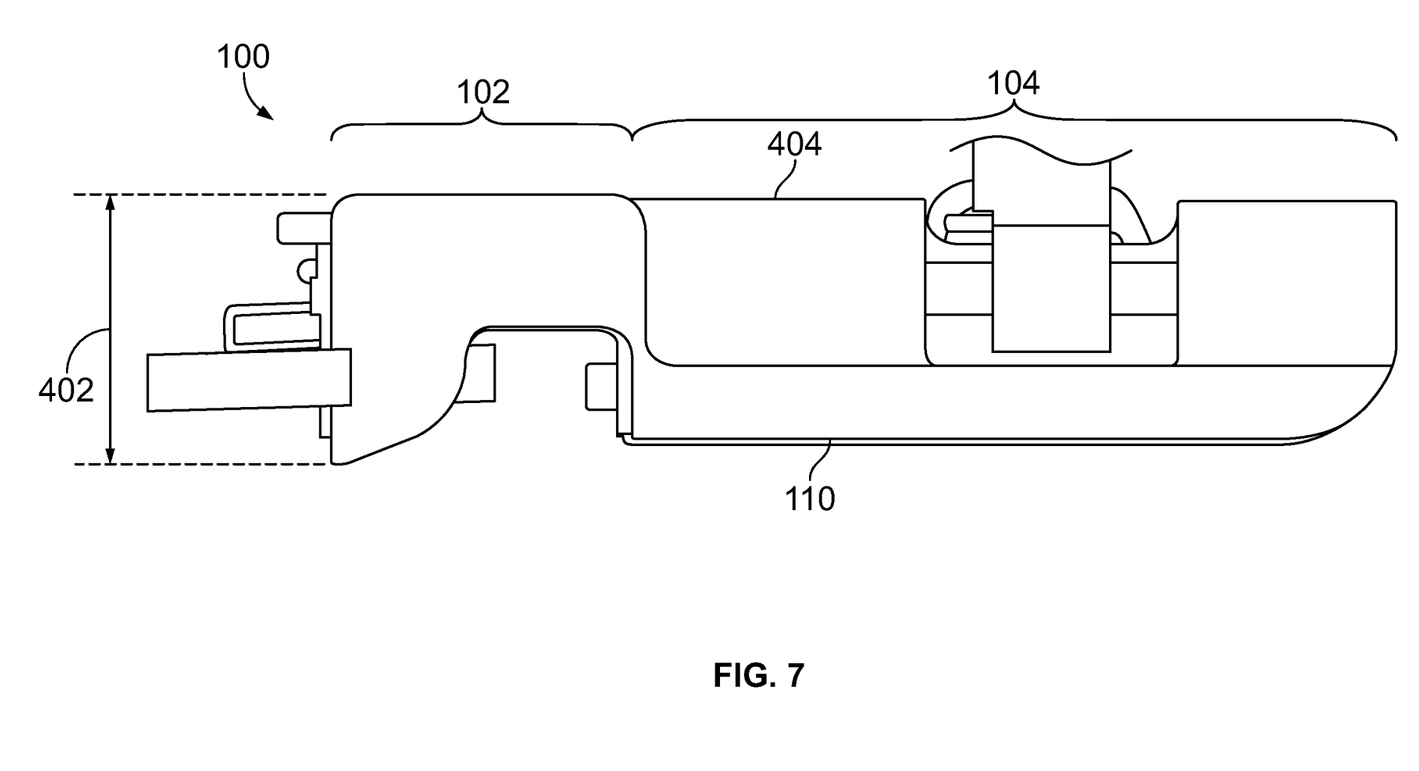
FIG. 7 is a side elevation view of the wheel chock assembly according to an embodiment.

FIG. 7 is a side elevation view of the wheel chock assembly. In an embodiment, the wheel chock assembly has a low profile. The stepped-box body and the first body portion have a total height 402 that extends from the coupling surface to a top 404 opposite the coupling surface. The top may be defined by the stepped-box body, the first body portion, or both bodies. For example, the bodies optionally may be the same height such that the top of the stepped-box body aligns with the top of the first body portion. The total height in an embodiment is no greater than 4.6 inches (11.68 cm). In a more specific example, the total height may be no greater than 4.5 inches (11.43 cm).

Figure 8:
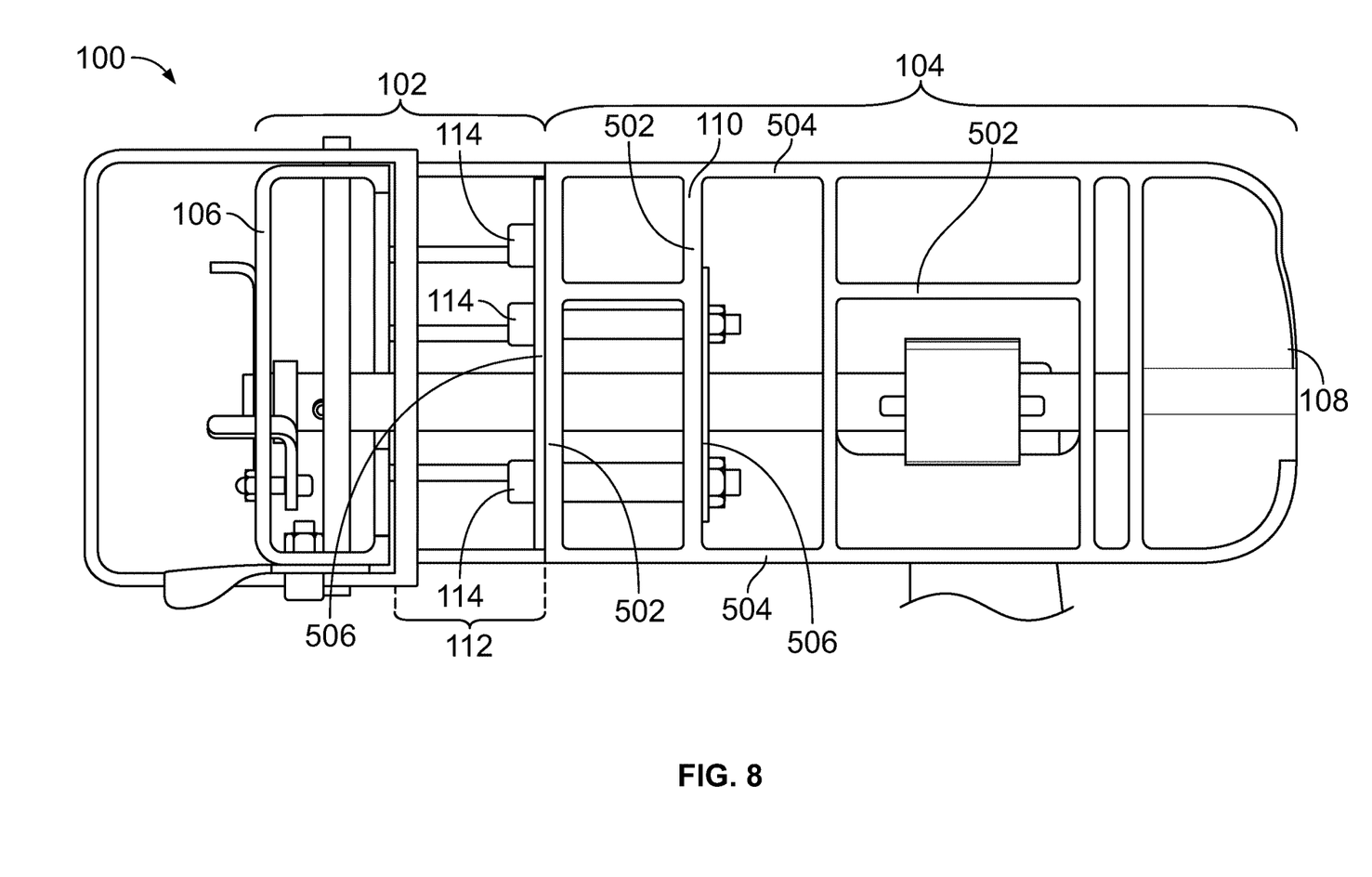
FIG. 8 is a plan view showing the coupling surface of the wheel chock assembly according to an embodiment.

FIG. 8 is a plan view showing the coupling surface of the wheel chock assembly according to an embodiment. The stepped-box body has at least two pins 114 laterally protruding from the stepped-box body beneath the first body portion. In the illustrated embodiment, the stepped-box body has three pins. The pins are positioned to be inserted into corresponding apertures in the chock rail. For example, each of the pins protrudes into the channel 112 of the first body portion. The locking pins are actuated to enter corresponding apertures in the chock rail for securing the wheel chock device to the carrier vehicle.

In an embodiment, the wheel chock device is relatively hollow and includes a series of intersecting members, referred to herein as webs 502, that connect side walls 504 and the end walls 106, 108 of the wheel chock device. The webs enhance the structural rigidity of the wheel chock device, relative to not including any structural members connecting the side walls and end walls. Optionally, at least some of the webs may be reinforced, such as with metal plates 506. For example, the webs through which the locking pins extend may be reinforced with metal plates, and the locking pins are held within openings of the metal plates.

Figure 9:
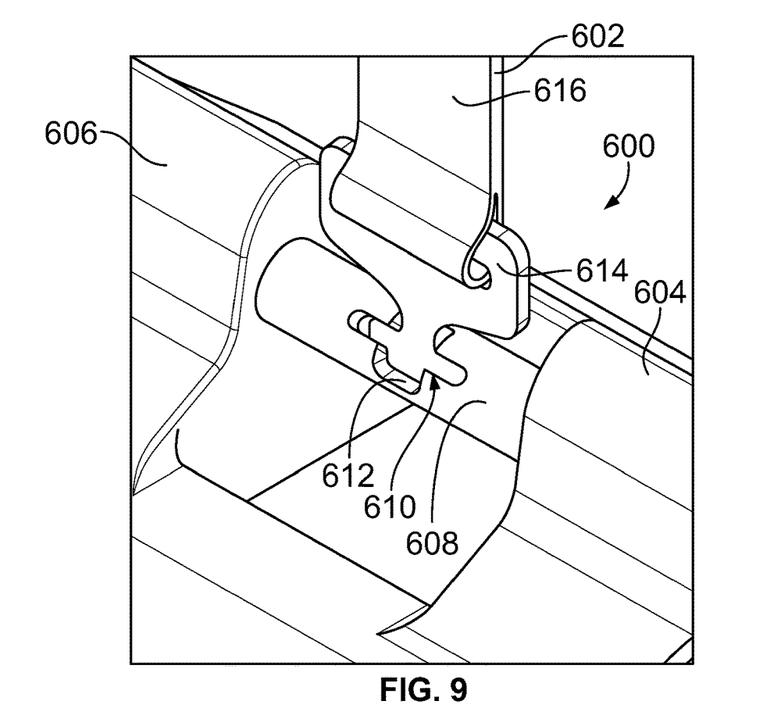
FIG. 9 is a perspective view of a coupling mechanism to releasably connect a harness to a wheel chock device according to an embodiment.

FIG. 9 is a perspective view of a coupling mechanism 600 to releasably connect a harness 602 to a wheel chock device 604 according to an embodiment. Only a portion of the harness and the wheel chock device are shown in FIG. 9. The harness may be the harness 101 shown in FIG. 2. The wheel chock device in the illustrated embodiment is an anchor chock device, and may be the same or similar to the second wheel chock device 30 shown in FIG. 1.

In an embodiment, the wheel chock device has a stepped-box body 606 that is the same or similar to the stepped-box body of the wheel chock device shown in FIGS. 2 through 8. The wheel chock device includes a rod 608 that is held by the stepped-box body. The rod may be oriented and located within the stepped-box body the same way as shown in FIGS. 3 and 4, for example. The rod is hollow and defines an opening 610 through a thickness of a wall 612 of the rod such that the opening is fluidly connected to an inner cavity within the rod. The opening does not extend out the other side of the rod (e.g., does not extend fully through the diameter of the rod). The opening is designed to accommodate a clip 614 of the harness 602 that is affixed to a strap 616 of the harness.

Although the coupling mechanism in an embodiment is utilized with an anchor chock of the type disclosed in FIGS. 1 through 8, the coupling mechanism can also be utilized with other types of chock devices. Optionally, the coupling mechanism may be used in non-chock-related applications in which a clip is desired to releasably connect to a rod, such as with harnesses used to tie down cargo on vehicles.

Figure 10:
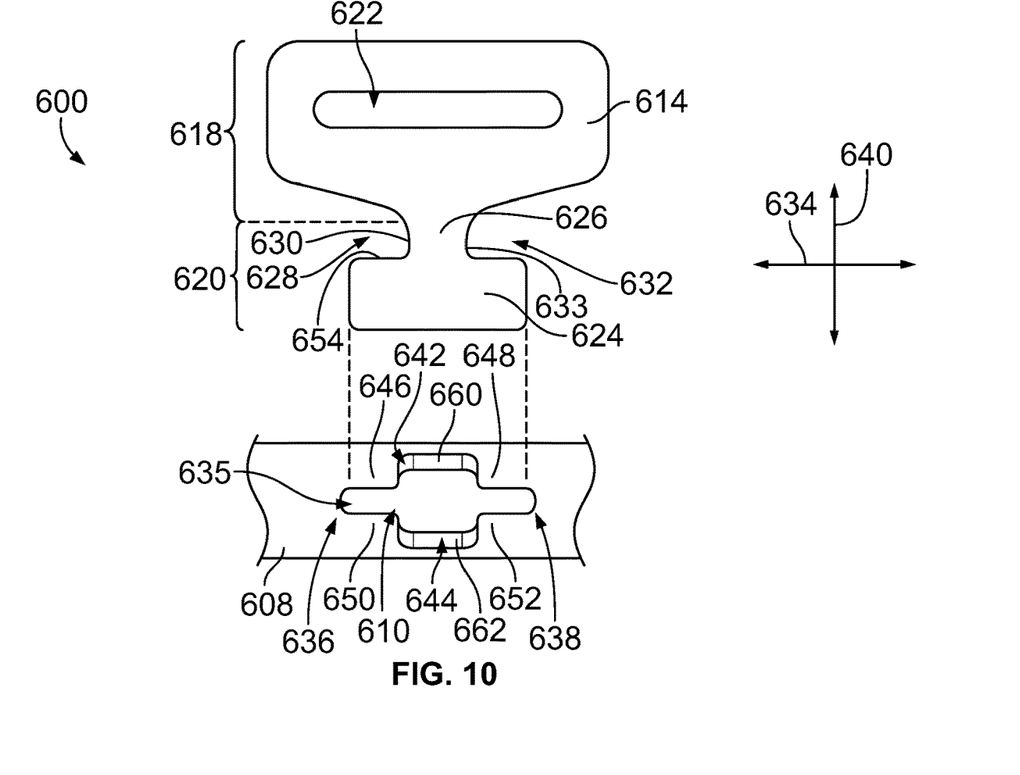
FIG. 10 illustrates a clip of the coupling mechanism in FIG. 9 poised for coupling to a rod of the coupling mechanism according to an embodiment.

FIG. 10 illustrates the clip 614 of the coupling mechanism 600 in FIG. 9 poised for coupling to the rod 608 according to an embodiment. The coupling mechanism 600 is oriented about a rod axis 634 that is parallel to the length of the rod, and a width axis 640 that is orthogonal to the rod axis 634.

The clip may be planar and formed as a monolithic (e.g., one-piece) body. The clip includes a base section 618 and a connector section 620. The connector section extends from the base section. The base section defines a narrow slot 622 therethrough to accommodate the strap for attachment to the strap. The slot through the base section may have a uniform width (along the width axis) for at least a majority of the length of the slot. The connector section is generally T-shaped, including a tab 624 and a neck 626. The neck is between the tab and the base section, and connects the tab to the base section. The neck is narrower than the tab (along the rod axis). The neck connects to a middle portion of the tab, such that the neck represents the vertical line of the T-shape, and the tab represents the horizontal line. The tab has a rectangular shape with rounded edges in the illustrated embodiment. The neck has narrower length along the rod axis than both the tab and the base section. A first recess 628 is defined between the tab and the base section along a first (e.g., left) edge 630 of the neck, and a second recess 632 is defines between the tab and the base section along a second (e.g., right) edge 633 of the neck.

The opening 610 in the rod has a central slot 635 that extends a length along the rod axis from a first end 636 of the slot to an opposite second end 638 of the slot. The central slot is longer than the length of the tab of the clip along the rod axis. The tab of the clip can be inserted into the opening through the slot, and removed from the opening through the slot.

The opening includes a first pocket 642 and a second pocket 644 that extend from the central slot in opposite directions from each other and increase the width of the opening (along axis 640). For example, the central slot is located between the first pocket and the second pocket along the width of the opening. The first pocket in the illustrated orientation is an upper or top pocket, and the second pocket is a lower or bottom pocket. The first and second pockets are located along a middle portion of the opening. The central slot is longer than the first and second pockets along the rod axis. For example, the lengths of the pockets along the rod axis are less than the length of the tab of the clip, so the tab cannot be inserted into the opening or removed from the opening through either of the pockets. The width of the opening between a distal edge 660 of the upper pocket and a distal edge 662 of the lower pocket may also be less than the length of the tab of the clip, so the tab also cannot enter or exit the opening through the pockets by rotating the clip 90 degrees relative to the rod.

The rod includes a first or upper pair of wings 646, 648 on either side of the upper pocket above the central slot, and a second or lower pair of wings 650, 652 on either side of the lower pocket below the central slot. The upper pocket and the upper pair of wings represents a first locking area for retaining the clip in the opening. The lower pocket and the lower pair of wings represents a second locking area for retaining the clip in the opening. When the neck of the clip is received into the upper pocket, as shown in FIG. 9, the upper pair of wings back up the tab. For example, the upper pair of wings extend into the first and second recesses of the clip and retain the tab in the opening by mechanically contacting base-facing edges 654 of the tab that face towards the base section. When the neck of the clip is received into the lower pocket, the lower pair of wings back up the tab by engaging the base-facing edges of the tab. The clip is only able to be inserted into the opening and removed from the opening when the clip is angled and positioned to align the tab with the central slot. The central slot represents an ingress and egress area for enabling the clip to enter and exit the opening of the rod.

Figure 11:
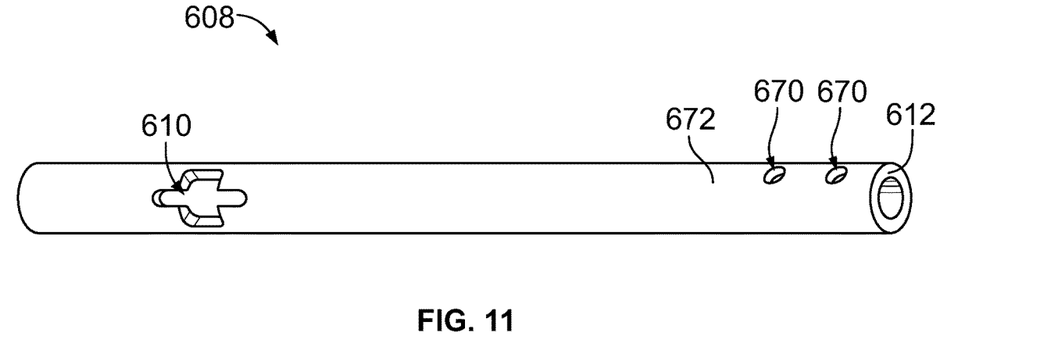
FIG. 11 is a perspective view of the rod of the coupling mechanism according to an embodiment.

FIG. 11 is a perspective view of the rod 608 of the wheel chock device 604 shown in FIGS. 9 and 10 according to an embodiment. In an embodiment, the rod includes at least one notch 670 along an outer, circumferential surface 672 of the rod. The at least one notch is spaced apart from the opening 610 along the length of the rod. The at least one notch may extend fully through the thickness of the wall 612 of the rod, or may extend through only a portion of the thickness of the wall. In the illustrated embodiment, the rod has two notches, but may have only one notch or more than two notches in other embodiments. Each notch is configured to receive a pin to define a detent for limiting rotation of the rod relative to the wheel chock device 604.

Figure 12:
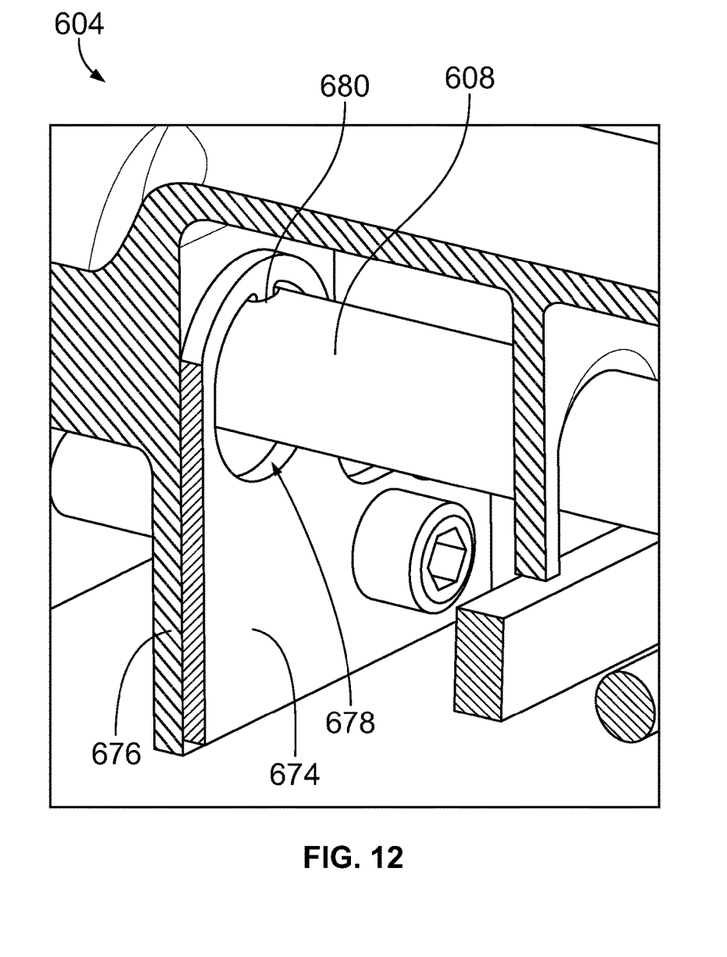
FIG. 12 is a perspective view of a portion of the wheel chock device shown in FIG. 9 according to an embodiment.

FIG. 12 is a perspective view of a portion of the wheel chock device 604 shown in FIG. 9 according to an embodiment. The illustrated portion shows a metal plate 674 that reinforces a structural member 676 (e.g., web) of the wheel chock device. The metal plate 674 may be similar to one of the metal plates 506 shown in FIG. 8. The metal plate defines an orifice 678 that is sized to accommodate the rod 608 therethrough. For example, a diameter of the orifice is greater than an outer diameter of the rod. The metal plate includes a protrusion 680, such as a pin, that extends generally radially into the orifice from an edge of the metal plate that defines the orifice. The protrusion is sized to be received into one of the notches of the rod. The protrusion may be a rigid, metal piece that is integrally connected to the metal plate.

In the illustrated embodiment, the orifice is sufficiently large to enable the rod to be loaded through the orifice without interfering with the protrusion. Once the notch aligns with the protrusion, the rod can be moved towards the protrusion to cause the protrusion to enter the notch. The rod may then be secured in place to prohibit the rod from backing away from the protrusion. When the protrusion is disposed within the notch, a detent is formed that inhibits rotation of the rod relative to the metal plate, and the chock device to which the metal plate is secured. The interaction between the protrusion and the notch also block axial movement of the rod (e.g., along the rod axis) relative to the wheel chock device. Although only one metal plate and notch is shown in FIG. 12, another metal plate may include a different protrusion that enters the other notch shown in FIG. 11.

Securing the rod in one, fixed position relative to the wheel chock device may be beneficial for the operation of the coupling mechanism 600 (shown in FIGS. 9 and 10). In an embodiment, When the rod is fixed in position relative to the wheel chock device via the one or more detents, the opening 610 is oriented to face in an oblique angle relative to horizontal and vertical planes. For example, the central cavity 635 may generally point at an angle that is between 30 degrees and 60 degrees, such as 45 degrees, up from horizontal. Stated differently, the clip must be oriented at an angle that is between 30 degrees and 60 degrees, such as 45 degrees, in order to insert the tab into the central cavity. Once the active wheel chock device is ratcheted to apply tension on the harness, the clip is pulled in the vertical direction by the harness, relative to the anchor wheel chock device. This movement pulls the clip into the first locking area, and the tab of the clip is retained behind the first set of wings on either side of the upper pocket. Once the tension is released, the weight of the clip and harness (e.g., due to gravity) may cause the clip to drop from the first locking area to the second locking area. For example, the neck enters the lower pocket, and the tab is retained in the opening by the second set of wings on either side of the lower pocket. In this scenario, by securing the rod in a fixed rotational position with the opening facing in an oblique angle, it is unlikely that the clip will fall out of the opening on its own. An operator may have to manually force the tab to align with the central cavity to release the harness from the anchor wheel chock device.

Figure 13:
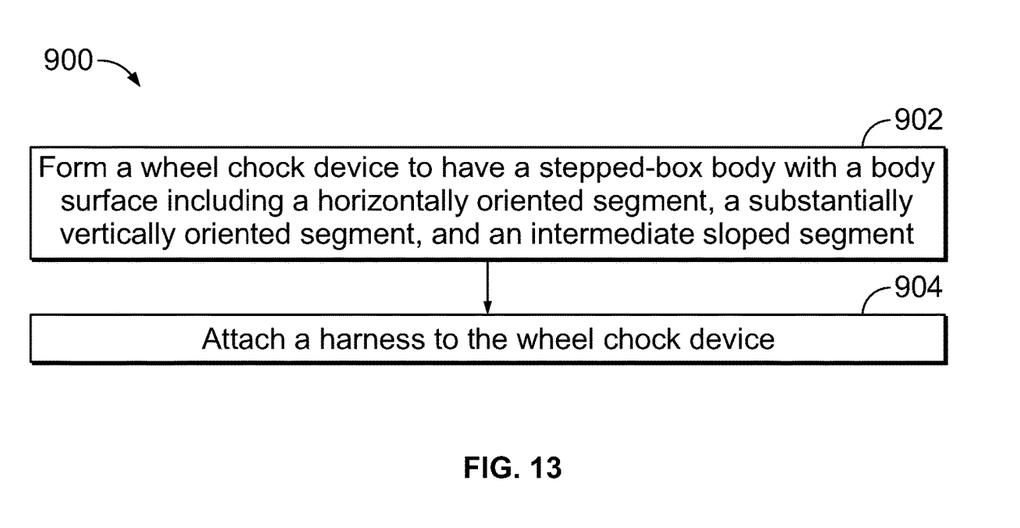
FIG. 13 is a flow chart of a method of providing a wheel chock device according to an embodiment.

FIG. 13 is a flow chart 900 of a method of providing a wheel chock device according to an embodiment. The method optionally includes more steps than shown in FIG. 9 or different steps than shown in FIG. 9. With reference to FIGS. 1 through 8, a wheel chock device for an automobile is formed at 902. The wheel chock device is formed to have stepped-box body with a coupling surface, a tire-contacting surface, and a body surface. The coupling surface is formed to face a supporting surface of a carrier vehicle on which the automobile is disposed. The tire-contacting surface is formed to engage a tire of the automobile. The body surface is formed to extend between the coupling surface and the tire-contacting surface along a perimeter of the stepped-box body.

The body surface is formed to face a body of the automobile. The body surface is formed to include a horizontally oriented segment, a substantially vertically oriented segment, and an intermediate sloped segment. The horizontally oriented segment is formed to be parallel to the coupling surface. The substantially vertically oriented segment is formed to be perpendicular to the horizontally oriented segment. The intermediate sloped segment extends from the horizontally oriented segment to the substantially vertically oriented segment.

Optionally, the stepped-box body is formed to have an R-value clearance range between the stepped-box body and the automobile of at least 2.51 inches (6.375 cm). Optionally, the stepped-box body is formed via a molding or casting process. The stepped-box body may be non-metallic, such as composed of a plastic material. In an embodiment, the intermediate sloped segment is formed to be generally planar and oriented at an angle between twenty degrees and forty degrees relative to the horizontally oriented segment. The intermediate sloped segment may have a greater width than either the horizontally oriented segment or the substantially vertically oriented segment. Optionally, the stepped-box body may be integrally formed side-by-side with a first body portion that defines a channel for accommodating a chock rail of the carrier vehicle.

At 904, a harness is attached to the wheel chock device. For example, the harness may be secured to a rod that is installed within the wheel chock device. The harness may be coupled to the rod through a cavity or window defined through the stepped-box body.

In one or more embodiments of the subject matter described herein, a wheel chock device is provided that includes a first body portion and a stepped-box body integrally formed with the first body portion. The stepped-box body has a lower portion and an upper portion. The stepped-box body transitions from a first generally planar, generally horizontal surface on the lower portion to an intermediate sloped surface to a generally planar, generally vertical surface on the upper portion. The lower portion has a second generally planar, generally horizontal surface configured to engage a supporting surface of a carrier vehicle on which an automobile is disposed. An opposite side of the upper portion that is opposite the generally planar, generally vertical surface defines a tire-contacting surface that is positioned to engage a vehicle tire of the automobile while the second generally planar, generally horizontal surface engages the supporting surface of the carrier vehicle.

Optionally, the intermediate sloped surface of the stepped-box body receives less stress while the tire-contacting surface engages the vehicle tire relative to a different wheel chock device that does not include the intermediate sloped surface.

Optionally, the first body portion and the stepped-box body have a total height that is no greater than 4.5 inches.

Optionally, the stepped-box body has an R-value clearance range between the stepped-box body and the automobile of at least 2.51 inches. Optionally, the stepped-box body has an R-value clearance range between the stepped-box body and the automobile of at least 2.586 inches.

Optionally, the intermediate sloped surface is generally planar and is oriented at an angle between twenty degrees and forty degrees relative to the second generally planar, generally horizontal surface.

Optionally, the first body portion and the stepped-box body are laterally disposed side-by-side to each other.

Optionally, the intermediate sloped surface is generally planar. The intermediate sloped surface intersects the first generally planar, generally horizontal surface at a first vertex and intersects the generally planar, generally vertical surface at a second vertex. Optionally, a first width of the intermediate sloped surface that extends from the first vertex to the second vertex is greater than a second width of the first generally planar, generally horizontal surface and is greater than a third width of the generally planar, generally vertical surface.

Optionally, the wheel chock device further includes a rod held by the stepped-box body. The rod defines an opening to receive a clip of a harness therein. The opening of the rod includes a central cavity, a first pocket, and a second pocket. The first pocket and the second pocket extend in opposite directions from the central cavity. The central cavity is longer than the first and second pockets along a rod axis. Optionally, the clip includes a tab configured to be received within the opening. A length of the central cavity along the rod axis is longer than a length of the tab, and respective lengths of the first and second pockets along the rod axis are shorter than the length of the tab.

In one or more embodiments, a wheel chock device is provided that includes a stepped-box body. The stepped-box body has a coupling surface, a tire-contacting surface, and a body surface. The coupling surface positioned to face a supporting surface of a carrier vehicle on which an automobile is disposed. The tire-contacting surface is positioned to engage a tire of the automobile, and the body surface extends between the coupling surface and the tire-contacting surface along a perimeter of the stepped-box body. The body surface is positioned to face a body of the automobile. The body surface includes a horizontally oriented segment that is parallel to the coupling surface, a generally vertically oriented segment that is generally perpendicular to the horizontally oriented segment, and an intermediate sloped segment extending from the horizontally oriented segment to the vertically oriented segment.

Optionally, the wheel chock device further includes a first body portion integrally formed with the stepped-box body and configured to couple with a chock rail in the carrier vehicle. Optionally, the stepped-box body includes at least two pins laterally protruding from the stepped-box body beneath the first body portion. The pins are positioned to be inserted into corresponding apertures in the chock rail.

Optionally, the intermediate sloped segment of the body surface is oriented at an angle between twenty and forty degrees relative to the horizontally oriented segment of the body surface.

Optionally, the intermediate sloped segment of the body surface receives less stress while the tire-contacting surface engages the tire relative to a different wheel chock device that does not include the intermediate sloped segment.

Optionally, the stepped-box body has an R-value clearance range between the stepped-box body and the automobile of at least 2.51 inches.

Optionally, the intermediate sloped segment of the body surface has a greater width than either the horizontally oriented segment of the body surface or the vertically oriented segment of the body surface.

In one or more embodiments, a method is disclosed for providing a wheel chock device. The method includes forming a wheel chock device for an automobile to have a stepped-box body with a coupling surface, a tire-contacting surface, and a body surface. The coupling surface is formed to face a supporting surface of a carrier vehicle on which the automobile is disposed. The tire-contacting surface is formed to engage a tire of the automobile. The body surface is formed to extend between the coupling surface and the tire-contacting surface along a perimeter of the stepped-box body, and to face a body of the automobile. The body surface is formed to include a horizontally oriented segment that is parallel to the coupling surface, a substantially vertically oriented segment that is perpendicular to the horizontally oriented segment, and an intermediate sloped segment extending from the horizontally oriented segment to the substantially vertically oriented segment.

Optionally, the stepped-box body is formed to have an R-value clearance range between the stepped-box body and the automobile of at least 2.51 inches.

In one or more embodiments, a coupling mechanism is provided that includes a clip and a rod. The clip includes a base section, a tab, and a neck. The neck connects the base section to the tab. The base section is configured to attach to a strap. The rod extends along a rod axis and is held by a wheel chock device. The rod defines an opening along an outer surface thereof. The opening includes a central cavity, a first pocket, and a second pocket. The first pocket and the second pocket extend in opposite directions from the central cavity. A length of the central cavity along the rod axis is longer than a length of the tab, and respective lengths of the first and second pockets along the rod axis are shorter than the length of the tab.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," "generally," and "approximately," may be not to be limited to the precise value specified. For example, such approximating terms may indicate inclusion of values within a designated threshold margin of the precise value. The threshold margin may be plus/minus 3% of the precise value, plus/minus 5% of the precise value, plus/minus 10% of the precise value, or the like. A generally vertical surface can be within 3 degrees of vertical in one example, within 5 degrees of vertical in a second example, and within 10 degrees of vertical in a third example. Vertical may refer to a direction of gravitational force on the wheel chock device. Horizontal may refer to a direction orthogonal to the direction of gravitational force. A generally horizontal surface can be within 3 degrees of horizontal in one example, within 5 degrees of horizontal in a second example, and within 10 degrees of horizontal in a third example. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A wheel chock device comprising:
    a first body portion; and
    a stepped-box body integrally formed with the first body portion, the stepped-box body having a lower portion and an upper portion, the stepped-box body transitioning from a first generally planar, generally horizontal surface on the lower portion to an intermediate sloped surface to a generally planar, generally vertical surface on the upper portion, the lower portion having a second generally planar, generally horizontal surface configured to engage a supporting surface of a carrier vehicle on which an automobile is disposed,
    wherein an opposite side of the upper portion that is opposite the generally planar, generally vertical surface defines a tire-contacting surface that is positioned to engage a vehicle tire of the automobile while the second generally planar, generally horizontal surface engages the supporting surface of the carrier vehicle, and
    wherein the intermediate sloped surface of the body surface has a greater width than at least one of the following: the first generally planar, generally horizontal surface or the generally planar, generally vertical surface.

2. The wheel chock device of claim 1, wherein the first body portion and the stepped-box body have a total height that is no greater than 4.5 inches.

3. The wheel chock device of claim 1, wherein the stepped-box body has an R-value clearance range between the stepped-box body and the automobile of at least 2.51 inches.

4. The wheel chock device of claim 1, wherein the stepped-box body has an R-value clearance range between the stepped-box body and the automobile of at least 2.586 inches.

5. The wheel chock device of claim 1, wherein the intermediate sloped surface is generally planar and is oriented at an angle between twenty degrees and forty degrees relative to the second generally planar, generally horizontal surface.

6. The wheel chock device of claim 1, wherein the first body portion comprises a rectangular box-shaped body, and the rectangular box-shaped body and the stepped-box body are laterally disposed side-by-side to each other.

7. The wheel chock device of claim 1, wherein the intermediate sloped surface is generally planar, the intermediate sloped surface intersecting the first generally planar, generally horizontal surface at a first vertex and intersecting the generally planar, generally vertical surface at a second vertex.

8. The wheel chock device of claim 7, wherein a first width of the intermediate sloped surface that extends from the first vertex to the second vertex is greater than a second width of the first generally planar, generally horizontal surface and is greater than a third width of the generally planar, generally vertical surface.

9. The wheel chock device of claim 1, further comprising a rod held by the stepped-box body, the rod defining an opening to receive a clip of a harness therein, wherein the opening of the rod includes a central cavity, a first pocket, and a second pocket, the first pocket and the second pocket extend in opposite directions from the central cavity, and the central cavity is longer than the first and second pockets along a rod axis.

10. The wheel chock device of claim 9, wherein the clip includes a tab configured to be received within the opening, wherein a length of the central cavity along the rod axis is longer than a length of the tab, and respective lengths of the first and second pockets along the rod axis are shorter than the length of the tab.

11. A wheel chock device comprising:
a stepped-box body having a coupling surface, a tire-contacting surface, and a body surface, the coupling surface positioned to face a supporting surface of a carrier vehicle on which an automobile is disposed, the tire-contacting surface positioned to engage a tire of the automobile, and the body surface extending between the coupling surface and the tire-contacting surface along a perimeter of the stepped-box body, the body surface positioned to face a body of the automobile,
the body surface including a horizontally oriented segment that is parallel to the coupling surface, a generally vertically oriented segment that is generally perpendicular to the horizontally oriented segment, and an intermediate sloped segment extending from the horizontally oriented segment to the vertically oriented segment,
wherein the intermediate sloped segment of the body surface has a greater width than either the horizontally oriented segment of the body surface or the vertically oriented segment of the body surface.

12. The wheel chock device of claim 11, further comprising:
a rectangular box-shaped body integrally formed with the stepped-box body and configured to couple with a chock rail in the carrier vehicle.

13. The wheel chock device of claim 12, wherein the stepped-box body includes at least two pins laterally protruding from the stepped-box body beneath the rectangular box-shaped body, the pins positioned to be inserted into corresponding apertures in the chock rail.

14. The wheel chock device of claim 11, wherein the intermediate sloped segment of the body surface is oriented at an angle between twenty and forty degrees relative to the horizontally oriented segment of the body surface.

15. The wheel chock device of claim 11, wherein the stepped-box body has an R-value clearance range between the stepped-box body and the automobile of at least 2.51 inches.

16. A method comprising:
forming a wheel chock device for an automobile to have a stepped-box body with a coupling surface, a tire-contacting surface, and a body surface, the coupling surface formed to face a supporting surface of a carrier vehicle on which the automobile is disposed, the tire-contacting surface formed to engage a tire of the automobile, and the body surface formed to extend between the coupling surface and the tire-contacting surface along a perimeter of the stepped-box body, the body surface formed to face a body of the automobile,
the body surface formed to include a horizontally oriented segment that is parallel to the coupling surface, a substantially vertically oriented segment that is perpendicular to the horizontally oriented segment, and an intermediate sloped segment extending from the horizontally oriented segment to the substantially vertically oriented segment,
wherein the intermediate sloped segment of the body surface has a greater width than either the horizontally oriented segment of the body surface or the vertically oriented segment of the body surface.

17. The method of claim 16, wherein the stepped-box body is formed to have an R-value clearance range between the stepped-box body and the automobile of at least 2.51 inches.

* * * * *